Feb. 18, 1947.　　　H. R. MOYER ET AL　　　2,416,197
PULLEY
Filed Aug. 19, 1943

WITNESSES:
Alice L. Howell
Nw. C. Groove

INVENTORS
Howard R. Moyer and
John Senkewitz.
BY
James N. Ely
ATTORNEY

Patented Feb. 18, 1947

2,416,197

UNITED STATES PATENT OFFICE 2,416,197

PULLEY

Howard R. Moyer, Wilkinsburg, Pa., and John Senkewitz, Detroit, Mich., assignors to Westinghouse Electric Corporation, East Pittsburgh, Pa., a corporation of Pennsylvania Application August 19, 1943, Serial No. 499,196

1 Claim. (Cl. 74—230.7)

This invention relates to pulleys.

Pulleys are employed quite extensively in airplanes and gliders for guiding the different control wires. It is preferred to utilize ball bearings in such pulleys but because of the scarcity of certain strategic materials it has now become impossible to fill the demand for aircraft pulleys with the present known antifriction ball bearing pulleys.

An object of this invention is to provide a composite pulley having lubricated bearing which has high strength.

Figure 1:
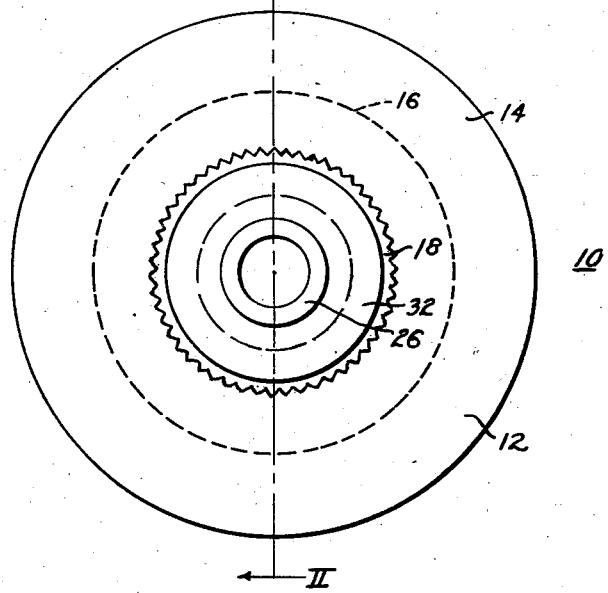
Figure 2:
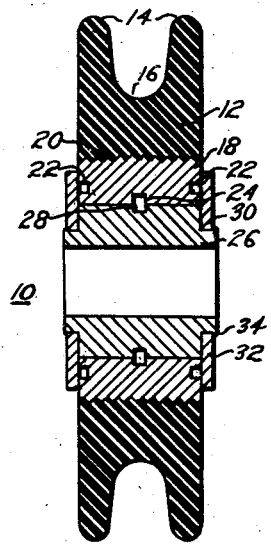

Other objects of this invention will become apparent from the following description when taken in conjunction with the accompanying drawing, in which:

Figure 1 is a plan view of a pulley constructed in accordance with this invention; and Fig. 2 is a view in section of the pulley taken along the line II—II of Fig. 1.

Referring to the drawing, there is illustrated a composite pulley 10 formed of a plurality of elements so associated as to produce a substantially free running pulley. The pulley 10 illustrated in Figs. 1 and 2 comprises a web 12 having spaced flanges 14 about its outer periphery disposed to form a groove 16, the web 12 being secured to a bushing 18. The bushing 18 of this embodiment is preferably of bronze having its outer surface roughened or knurled as indicated at 20, the purpose of which will be explained more fully hereinafter.

The web 12 and the flanges 14 carried thereon are formed of fibrous material such as cloths of woven fabric or paper which is impregnated with a phenolic, urea or other condensation resin product being molded under heat and pressure to a required shape. In molding the web 12, the impregnated fibrous material may be in the form of laminated sheets or the impregnated fibrous material may be macerated or comminuted to facilitate the molding of the material to shape. The groove 16 may be either molded into the web 12 during the molding of the impregnated fibrous material or machined into the web after the molding operation.

In practice, a preformed blank (not shown) of the impregnated fibrous material is preferably first formed to a required size, the blank being formed either of the laminated material or the comminuted material. Where the comminuted material is employed, facing sheets (not shown) may be utilized as described in Patent 2,198,831 which issued April 30, 1940, to H. R. Moyer for increasing the flange strength of the resulting pulley. The preforms are positioned about the knurled bushing 18 which is centrally disposed in a suitable mold and under the influence of heat and pressure the impregnated fibrous material of the preform is consolidated into an integral unit with the knurled bushing 18, the web 12 being securely interlocked with the knurled surface 20 of the bushing. As illustrated, the bronze bushing 18 is provided with a groove 22 on each of its side faces and a groove 24 in its bearing face midway between its side faces. The purpose of the grooves 22 and 24 will become apparent from the description given hereinafter.

The bushing 18 having the web 12 secured thereto is disposed in a bearing relation on a spindle 26 of steel, the spindle preferably being disposed to be secured to a shaft (not shown) in any suitable manner. The spindle 26 is provided with a bearing surface about its periphery which is substantially the same width as the bearing surface of the bushing 18. The bearing surface of the spindle 26 is also provided with a groove 28 disposed in alignment with the groove 24 carried by the bushing 18 being disposed to cooperate therewith in forming a main lubricating channel.

In order to retain the bushing 18 in assembled bearing relation with the spindle 26, the ends of the spindle 26 are notched as at 30 for receiving washers 32 of steel. The washers 32 are preferably of a size sufficient to extend radially outwardly from the spindle 26 a distance sufficient to cover the grooves 22 carried in the side faces of the bushing 18. Prior, however, to disposing the washers 32 in the notches on the ends of the spindle 26, the grooves 22 and the cooperating grooves 24 and 28 are filled with a suitable lubricating medium such as grease for effectively providing a source of lubrication for the bearing surfaces of the assembled unit. With the washers 32 in position about the ends of the spindle 26, the ends of the spindle are peened or spun over as at 34 to securely hold the washers seated against the notched ends of the spindle.

When thus assembled, it is found that the lubricating medium carried in the grooves 22, 24 and 28 effectively lubricates the main bearing surfaces of the bushing 18 and spindle 26 as well as lubricating the side faces of the bushing 18 which, in operation, rotate with respect to the washers 32 which are secured to the spindle. Because of the ruggedness of the composite pulley described hereinafter, the pulley has high load carrying capacity and since a constant source of lubrication is provided, the pulley has a relatively long life, being capable of withstanding bearing pressures as high as 4500 pounds per square inch.

Although this invention has been described with reference to a particular embodiment thereof, it is, of course, not to be limited thereto except insofar as is necessitated by the scope of the appended claim.

We claim as our invention:

In a pulley, the combination comprising, a bushing having bearing faces on its inner periphery and ends, grooves disposed in the bearing faces on the inner periphery and ends of the bushing, a spindle disposed for receiving the bushing in a bearing relation, a side plate carried by each end of the spindle disposed in bearing relation with at least a part of an associated end of the bushing including the groove therein and being disposed to retain the bushing and spindle in bearing relation, and a lubricating medium carried in the grooves disposed to lubricate the bearing surfaces of the bushing, spindle and side plates.

HOWARD R. MOYER.
JOHN SENKEWITZ.

REFERENCES CITED

The following references are of record in the file of this patent:

UNITED STATES PATENTS

| Number | Name | Date |
| --- | --- | --- |
| 1,750,278 | Moyer et al. | Mar. 11, 1930 |
| 2,198,831 | Moyer et al. | April 30, 1940 |
| 2,137,987 | Smith | Nov. 22, 1938 |
| 1,975,565 | Bilty | Oct. 2, 1934 |
| 706,211 | Apelt | Aug. 5, 1902 |